Patented May 11, 1937

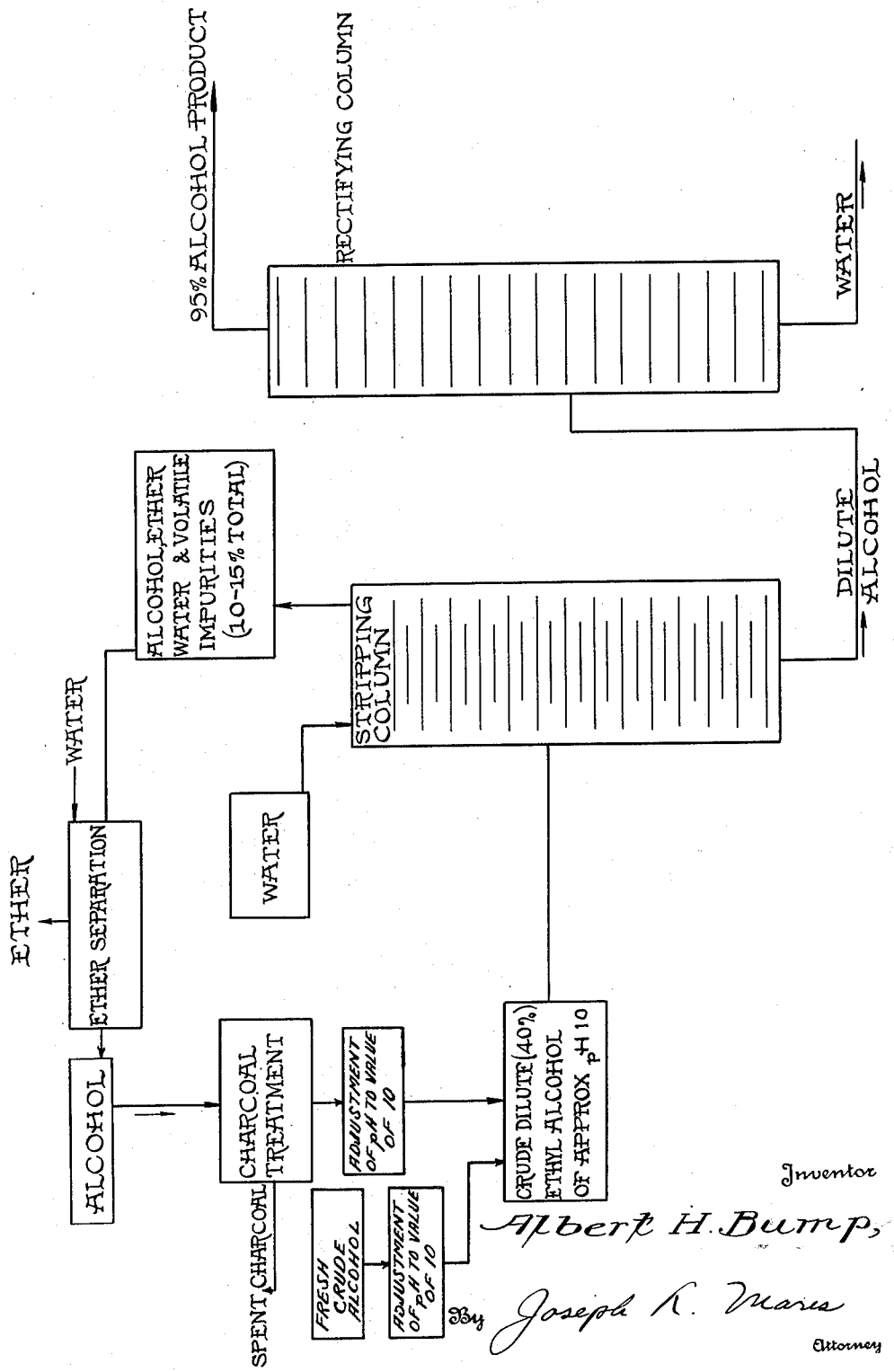

2,080,111

UNITED STATES PATENT OFFICE 2,080,111

PURIFICATION OF ALCOHOLS OBTAINED FROM OLEFINES

Albert H. Bump, Watertown, Mass., assignor, by mesne assignments, to Monsanto Chemical Company, a corporation of Delaware Application May 28, 1934, Serial No. 727,964

12 Claims. (Cl. 202—57)

This invention relates to the manufacture of aliphatic alcohols which are derived from normally gaseous olefines, such as ethyl, isopropyl and isobutyl alcohols, and it has particular application to the purification of such alcohols to remove impurities commonly associated with alcohols obtained from olefines of cracked petroleum origin.

The manufacture of alcohols from normally gaseous olefines is well known. Various methods for effecting this conversion have been proposed, including the direct or catalytic hydration of olefines and the indirect hydration wherein the olefine is first combined with an inorganic acid, such as sulphuric acid, to form an ester, that subsequently is hydrolyzed to regenerate the free inorganic acid and produce the alcohol corresponding to the olefine or olefines which previously were combined with the acid to form the ester.

One object of the present invention is to provide a method of purifying alcohols obtained from olefines by which the quality attained is comparable to the best grade of alcohol obtainable by the well known fermentation processes and which may be utilized for purposes such as cologne spirits and the like.

A further object of the present invention is to provide a method of purification which is conveniently adapted to present day alcohol refining equipment and economical as well as efficient to operate.

A further and more specific object of the present invention is to provide a method of producing cologne spirits derived from ethylene of a cracked hydrocarbon origin, in which the ethylene has been combined with sulphuric acid to form an ethyl sulphate ester mixture, rich in diethyl sulphate.

Although alcohols obtained from olefines and refined by ordinary methods are satisfactory for some purposes where the purity is of minor consequence or where the product is not obtainable by other competitive processes, for most purposes the alcohol is unsatisfactory. This is particularly true of ethyl alcohol, the quality of which is compared by the consuming public with alcohol obtained by fermentation of grain or molasses.

Impurities associated with alcohols obtained from olefines are varied and for the most part not readily separable from the alcohol even though they are present in only small amounts. In part these impurities may be of an aldehydic or ketonic nature. In part they are of an inorganic nature, dependent upon the method of hydration. Thus, for example, sulphur dioxide is present when sulphuric acid is utilized as a hydrating medium. And, finally, in part they are of an undetermined organic nature. (Due to the fact that their chemical constitution is not known definitely, these last referred to impurities are designated herein as "hydrocarbon" impurities notwithstanding the fact that the materials may be sulphur derivatives of hydrocarbons. These "hydrocarbon" impurities are characterized by the fact that they cannot be separated from the alcohols by ordinary methods of distillation or fractionation, and they impart a foul, undesirable odor to the alcohol characteristic of the crude olefine gases such as are obtained in the cracking of petroleum hydrocarbons and which may be recognized as a foul or sour gasoline odor.)

When an alcohol such as ethyl alcohol, that has been derived from a cracked petroleum olefine, is purified by the ordinary methods of fractionation and distillation, the quality thereof is improved somewhat so far as the aldehydic impurities are concerned, but the volatile "hydrocarbon" impurities remain, and regardless of the number of times the material is distilled the characteristic odor persists to such an extent as to render the product of no value for competitive marketing purposes. Small amounts of "hydrocarbon" impurities in alcohol as refined above are recognized by the following tests:

A: 2–10 cc. of 95% alcohol are poured into about 50 cc. of distilled water which is at a temperature of 60° C.–70° C. Immediately thereafter a foul odor is evolved which is reminiscent of sour gasoline.

B: About 10 cc. of the 95% alcohol is added to a test tube containing 2 cc. of water white C. P. sulphuric acid (specific gravity 1.835), the alcohol and acid both being at room temperature. The tube is shaken to obtain thorough mixing of the constituents. Depending upon the amount of the "hydrocarbon" impurities present, the solution becomes colored, the color ranging from a delicate lavender to a deep pink. Depending also on the amount of "hydrocarbon", the time required for the development of the color varies from a few seconds to several hours.

Tests A and B are referred to hereinafter as the odor test and the sulphuric acid test, respectively. A satisfactorily purified alcohol gives no odor test nor will a positive sulphuric acid test be obtained even after the alcohol-sulphuric acid mixture is aged several days.

C: The 95% spirit when diluted with 20 to 50 volumes of cold water becomes faintly milky or opalescent due, in all probability to the separation of the "hydrocarbon" which is soluble in the concentrated alcohol but which is immiscible with water or very dilute alcohol.

It has already been indicated that one of the specific objects of the invention is to provide a method of purifying ethyl alcohol obtained from ethylene of a cracked petroleum origin, which ethylene has been converted to an ethyl sulphate ester rich in the diethyl sulphate form. It is recognized by those skilled in the art that in order to attain the most efficient use of sulphuric acid it is desirable to combine as much ethylene with the sulphuric acid as is otherwise practicable. Theoretically, two mols of ethylene will combine with one mol. of sulphuric acid to form one mol. of diethyl sulphate. When one mol. of diethyl sulphate is hydrolyzed it forms two mols of ethyl alcohol and one mol. of sulphuric acid. On the other hand, if one mol. of ethylene be combined with one mol. of sulphuric acid the half ester or ethyl acid sulphate is formed. Upon hydrolysis, the half ester produces only one mol. of alcohol and one mol. of sulphuric acid. It is evident, therefore, that to obtain the most efficient use of the acid one should press the combination of ethylene and sulphuric acid to the diethyl sulphate form as far as practicable. One of the limiting factors in this direction is the quality of the alcohol obtained. Thus, when one or less than one mol. of ethylene is combined with one mol. of sulphuric acid, an alcohol which is comparatively easy to refine is obtained. When substantially more than one mol. of ethylene is combined with one mol. of sulphuric acid, the conditions of the reaction being more drastic, the quality of the alcohol obtained is markedly inferior and more difficult to refine due to excessive amounts of "hydrocarbon" impurities. By means of the present invention this factor is for practical purposes obviated insofar as it bears upon the amount of ethylene which can economically be combined with a given amount of sulphuric acid, and it therefore enables one to operate the alcohol process, as a whole, more economically and advantageously.

It is to be understood that the mixture of ethyl esters obtained when ethylene is combined with sulphuric acid varies and that even under the most favorable conditions it is impractical to obtain a complete conversion of sulphuric acid to diethyl sulphate. In the absence of catalysts a typical sulphate ester mixture, which is high in the amount of ethylene absorbed, will consist of 60% by weight of diethyl sulphate, 30% of ethyl acid sulphate, and 10% free sulphuric acid.

The method by which the sulphate ester mixture is hydrolyzed and the alcohol recovered forms no part of the present invention. Any desired procedure for effecting this hydrolysis and recovery of alcohol may be employed.

When an ethyl sulphate mixture is hydrolyzed and the alcohol is recovered therefrom, as by distillation, one obtains an ethyl alcohol mixture of approximately 50% by weight or less. The mixture contains one to four or even more per cent by weight of diethyl ether, small amounts of sulphur dioxide, acetaldehyde, immiscible high boiling hydrocarbon oils, and the comparatively lower boiling, foul smelling "hydrocarbons" in solution.

When an anhydrous alcohol product is not desired or required, I prefer to eliminate the impurities by an alternative procedure, which is based on the observation that the "hydrocarbon" impurities are separable from alcohol by distillation under conditions which enable one to remove the same as a ternary mixture of water, alcohol and "hydrocarbon." To this end the crude aqueous alcohol, obtained upon hydrolysis and distillation of the ethyl sulphate, is adjusted to a concentration of approximately 40% alcohol by weight. Lower alcohol concentrations are operative although they entail higher subsequent rectifying costs. Substantially higher concentrations give inferior results which can be offset in part by adding more water at the top of the column. Sufficient caustic soda is added to the alcohol to bring the pH of the mixture to approximately nine or preferably ten as determined by the Hellige-Klett hydrogen ion comparator. This degree of alkalinity appears to function most satisfactorily so far as "hydrocarbon" elimination and the economies of process are concerned. A higher concentration of caustic may be employed, although in general this does not improve the results. A lower pH concentration may be employed insofar as the elimination of the sulphur dioxide is concerned, but with a pH of seven or even eight the removal of hydrocarbon impurities is not as satisfactory. In general, a pH value less than five will result in a small amount of the sulphur dioxide being carried over into the refined alcohol. The more expensive caustic potash may be employed but no commensurate advantages are gained thereby. Soda ash and potash are satisfactory substitutes for caustic soda to promote hydrocarbon elimination, although they lack to some degree the resinifying action of caustic soda upon aldehydic impurities, if any. The crude distillate so treated is then fed continuously to the appropriate plate of a stripping column of the usual commercial design employed in grain and molasses alcohol plants to remove the relatively more volatile impurities. During this operation there is fed to the top of the stripping column an amount of fresh water, preferably at a temperature of 70° C.–75° C. equal to 10% of the weight of the crude alcohol being introduced into the column or correspondingly more if more concentrated alcohol is employed. The still is operated at such a rate that the overhead distillate has a composition substantially as follows:

| | Percent |
|---|---|
| Alcohol | 60 |
| Diethyl ether | 30 |
| Water | 8–10 |
| Soluble "hydrocarbon" and other impurities | 2 |

Obviously, the foregoing proportions may be varied widely, the one limitation being that the soluble "hydrocarbon" impurities shall be removed as a ternary mixture, leaving dilute alcohol to be withdrawn from the base of the column. The alcoholic liquid discharged from the base of the aldehyde column is essentially free of all low boiling and otherwise inseparable "hydrocarbon" impurities, and is fed continuously to a rectifying column of standard design. By operating this rectifying column in the usual manner with regard to throughput and reflux ratio, an alcohol of 95% is readily obtained, which is entirely free of malodorous hydrocarbons, which gives a negative sulphuric acid test, and which otherwise is equal to a good market grade of spirits, that is middle run molasses alcohol or grain alcohol, and finally, no fusel oil is present. By the usual method of double distillation common in grain or molasses alcohol manufacture, ethyl alcohol derived from ethylene of cracked petroleum origin and refined by the foregoing method may be converted to the best grade of cologne spirit.

The small quantity of non-miscible, high boiling hydrocarbons are separated and withdrawn from the rectifying column in the same manner as fusel oils from molasses or grain alcohol. These hydrocarbons are non-miscible in the 40% crude and are not nearly as malodorous as the low boiling hydrocarbons which are soluble in the 40% crude alcohol.

The head fraction obtained in the stripping column consists of a mixture of an alcohol, ether, water and the malodorous hydrocarbons. The amount of alcohol therein is equivalent to approximately 10%–15% of the pure alcohol produced. To recover this alcohol the distillate is diluted with water until the weight ratio of alcohol to water is approximately 3:7. The ether is then recovered by distillation in a batch still provided with a fractionating column, after which the ether free alcohol of approximately 30% strength is cooled to 25° C.–35° C. and agitated with such activated decolorizing charcoal as "Nuchar". For this purpose 8–10 grams of charcoal and 10–12 grams of filteraid (i. e. diatomaceous earth) will be found sufficient for each gallon of 30% alcohol treated. After agitating the mixture for about thirty minutes the charge is filtered and the clear alcoholic solution, which is largely freed of malodorous hydrocarbons, is returned to the crude alcohol storage where it is combined with a subsequent charge of alcohol, treated with caustic soda and in this manner reprocessed with fresh crude alcohol. The foregoing treatment with activated charcoal does not render the dilute alcohol perfectly pure, but it is sufficiently pure so that the foregoing method of recycling the "heads" avoids an accumulation of impurities in the system.

It is to be understood that the alkalinity may be varied somewhat and that the base employed may consist of one or more well known alkaline substances which are sufficiently soluble to afford the degree of alkalinity required. It is likewise to be understood that the dilution of the alkaline alcohol which is stripped to remove the hydrocarbon impurities as a ternary mixture of alcohol, water and hydrocarbon may be varied. In general, I have found that a 40% alcohol is sufficiently dilute to afford rapid and complete removal of the hydrocarbon while at the same time excessive subsequent rectification costs are avoided. In general, I have found that a 40% alcoholic solution, having a pH of approximately 10 is readily stripped of the hydrocarbon impurity, but as indicated heretofore these conditions may be varied and the principles of my invention are not limited to any specific set of conditions.

Although I have described my invention as applied to ethyl alcohol, it is to be understood that it is applicable in like manner to isopropyl alcohol and with a considerable degree of success to the butyl alcohols.

The accompanying flow sheet shows diagrammatically the directions of flow of the various liquids in the present process.

What I claim is:

1. In the method of purifying alcohols selected from the group ethyl, butyl, propyl and derived from olefines of a cracked hydrocarbon origin, which alcohols contain a hydrocarbon impurity suggestive of sour gasoline, which includes the steps of rendering the alcohol alkaline and then distilling the hydrocarbon impurity from said alkaline alcohol as a ternary alcohol-hydrocarbon-water mixture while retaining the main volume of alcohol in liquid phase until removal of the impurity is completed.

2. The method as defined in claim 1 and further characterized in that the alcohol which has been stripped of the hydrocarbon impurity is then rectified.

3. The method as defined in claim 1 and further characterized in that the distillate obtained during the stripping operation is treated with an adsorptive agent such as charcoal, "Nuchar", or other adsorptive carbon, whereby a substantial amount of the impurity is eliminated and an alcohol product obtained thereby which is returned to the process without resulting in an accumulation of hydrocarbon impurities in the system.

4. The method as defined in claim 1 and further characterized in that a water soluble alkali is present in the alcohol undergoing the stripping operation in an amount sufficient to produce a pH value of at least 8.

5. The method as defined in claim 1 and further characterized in that a caustic alkali is present in sufficient amount to produce a pH value of at least 8.

6. The method as defined in claim 1 and further characterized in that a caustic alkali is present in sufficient amount to produce a pH value of approximately 10.

7. The method as defined in claim 1 and further characterized in that the alcohol undergoing the stripping operation is not substantially more concentrated than approximately 40%.

8. The method as defined in claim 1 and further characterized in that the alcohol undergoing the stripping operation is not substantially more concentrated than 40% and the pH value is approximately 10.

9. The method as defined in claim 1 and further characterized in that water is added to the top of the stripping column to facilitate the elimination of the hydrocarbon impurity.

10. The method as defined in claim 1 and further characterized in that water at a temperature of approximately 70° C.–75° C. is added to the top of the stripping column to facilitate the elimination of the hydrocarbon.

11. The method as defined in claim 1 and further characterized in that water is added to the top of the stripping column to facilitate the elimination of the hydrocarbon, the amount thereof being approximately 10% of the weight of the crude alcohol mixture being stripped in the column.

12. The method as defined in claim 1 and further characterized in that water is added to the top of the stripping column to facilitate the elimination of the hydrocarbon, the amount thereof being approximately 10% of the weight of the crude alcohol mixture being stripped in the column and the rate of operating the stripping column is such that the distillate contains water and alcohol in the ratio of approximately 6:1.

ALBERT H. BUMP.